(12) United States Patent
Shiiba et al.

(10) Patent No.: US 8,075,445 B2
(45) Date of Patent: Dec. 13, 2011

(54) DRIVING FORCE CONTROL APPARATUS AND DRIVING FORCE CONTROL METHOD

(75) Inventors: Kazuyuki Shiiba, Susono (JP); Kunihiro Iwatsuki, Toyota (JP); Shinya Iizuka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 395 days.

(21) Appl. No.: 11/491,039

(22) Filed: Jul. 24, 2006

(65) Prior Publication Data

US 2007/0032341 A1   Feb. 8, 2007

(30) Foreign Application Priority Data

Aug. 3, 2005   (JP) ................................. 2005-225888

(51) Int. Cl.
*F16H 59/60* (2006.01)
(52) U.S. Cl. ............................................. 477/97; 701/65
(58) Field of Classification Search .................... 701/65; 477/97
See application file for complete search history.

(56) References Cited

U.S. PATENT DOCUMENTS

| | | | |
|---|---|---|---|
| 5,720,690 A | | 2/1998 | Hara et al. |
| 6,070,118 A | * | 5/2000 | Ohta et al. ...................... 701/65 |
| 6,085,137 A | * | 7/2000 | Aruga et al. .................... 701/51 |
| 6,182,000 B1 | * | 1/2001 | Ohta et al. ...................... 701/55 |
| 6,278,928 B1 | * | 8/2001 | Aruga et al. .................... 701/65 |
| 6,725,144 B2 | * | 4/2004 | Shiimado et al. ............... 701/65 |
| 6,920,384 B2 | * | 7/2005 | Shiimado et al. ............... 701/65 |
| 2002/0017413 A1 | | 2/2002 | Ochiai et al. |
| 2002/0173896 A1 | | 11/2002 | Ishizu et al. |

FOREIGN PATENT DOCUMENTS

| | | |
|---|---|---|
| JP | 04-064765 | 2/1992 |
| JP | 2004-116637 | 4/2004 |
| JP | 2005-193794 | 7/2005 |

OTHER PUBLICATIONS

United States Official Action issued on Nov. 26, 2010 in U.S. Appl. No. 11/094,216, filed Mar. 31, 2005.

* cited by examiner

*Primary Examiner* — David D Le
*Assistant Examiner* — Derek D Knight
(74) *Attorney, Agent, or Firm* — Oblon, Spivak, McClelland, Maier & Neustadt, L.L.P.

(57) ABSTRACT

In a driving force control apparatus and a driving force control method, a curve ahead of a vehicle is detected; a target vehicle speed is set to pass the curve; a starting-point shift speed is set to pass the starting point of the curve; and an end-point shift speed is set to pass the end point of the curve. After a shift speed is changed to the starting-point shift speed, it is determined whether an additional engine brake is required at the starting-point shift speed. If it is determined that the engine brake is not required, the shift speed is changed to the end-point shift speed. Alternatively, if a vehicle speed is lower than or equal to a value corresponding to the target vehicle speed after the shift speed is changed to the starting-point shift speed, the shift speed is changed to the end-point shift speed.

26 Claims, 12 Drawing Sheets

FIG. 5

EXAMPLE OF MAP USED TO CALCULATE TARGET END-POINT SHIFT SPEED

| | | CURVATURE | | |
|---|---|---|---|---|
| | | HAIRPIN CURVE | MEDIUM CURVE | GENTLE CURVE |
| ROAD GRADIENT | SHARP UPWARD SLOPE | THIRD SPEED | THIRD SPEED | FOURTH SPEED |
| | GENTLE UPWARD SLOPE | THIRD SPEED | FOURTH SPEED | FOURTH SPEED |
| | FLAT ROAD | FOURTH SPEED | FOURTH SPEED | FIFTH SPEED |
| | GENTLE DOWNWARD SLOPE | THIRD SPEED | FOURTH SPEED | FOURTH SPEED |
| | SHARP DOWNWARD SLOPE | THIRD SPEED | THIRD SPEED | FOURTH SPEED |

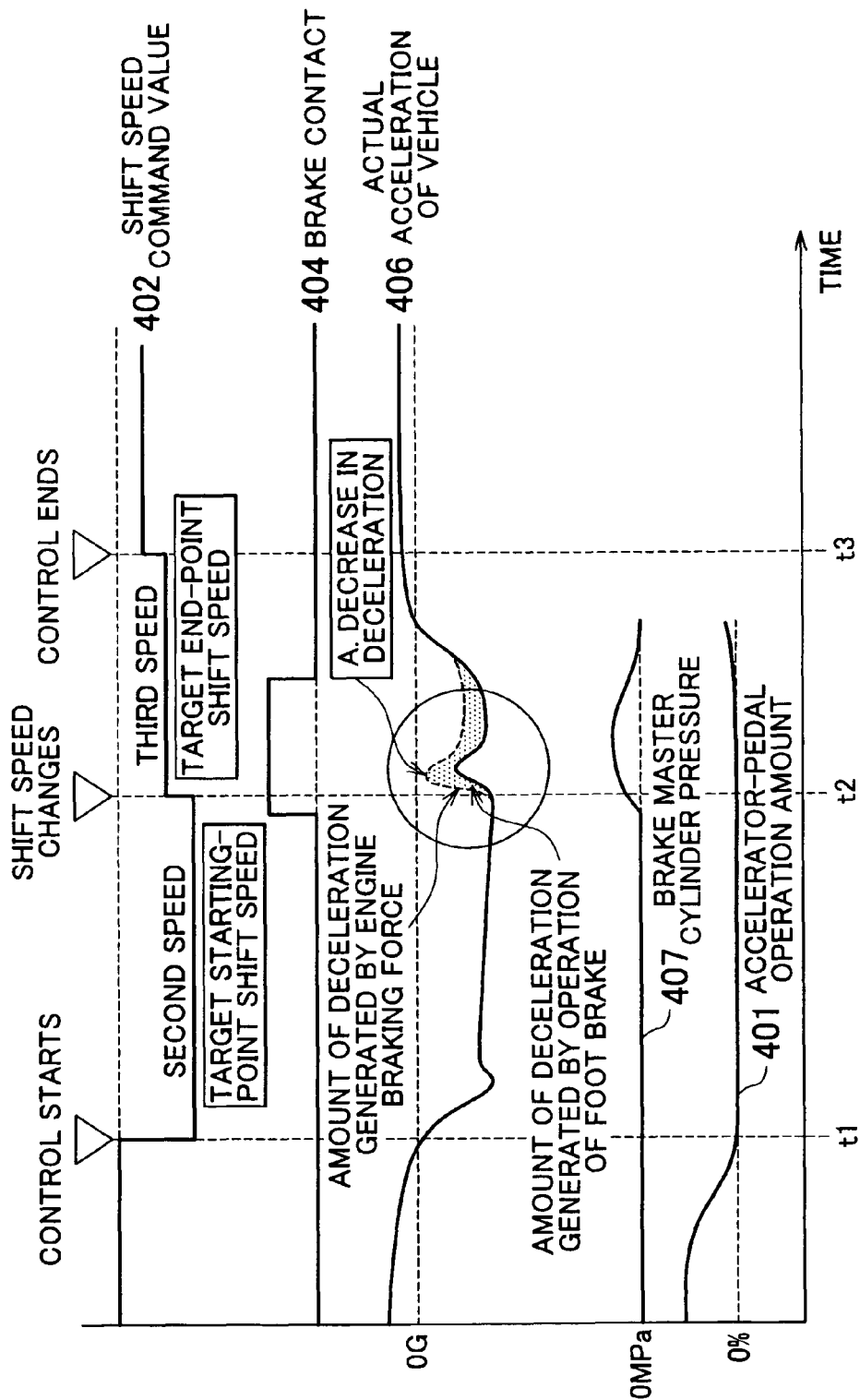

DRIVING FORCE CONTROL APPARATUS AND DRIVING FORCE CONTROL METHOD

INCORPORATION BY REFERENCE

The disclosure of Japanese Patent Application No. 2005-225888 filed on Aug. 3, 2005, including the specification, drawings and abstract is incorporated herein by reference in its entirety.

BACKGROUND OF THE INVENTION

1. Field of the Invention

The invention relates to a driving force control apparatus and a driving force control method. More particularly, the invention relates to a driving force control apparatus and a driving force control method which change a shift speed from an optimal shift speed for passing the starting point of a curve to an optimal shift speed for passing the end point of the curve at an optimal time point when the vehicle goes round the curve.

2. Description of the Related Art

Japanese Patent Application Publication No. JP-A-2000-27981 describes a shifting control apparatus which includes a starting-point control means, a curve control means, an end-point control means, and selection control means. The starting-point control means sets a driving force appropriate for passing the starting point of a curve ahead of a vehicle, based on an optimal driving force at each point of a road ahead of the vehicle. The optimal driving force at each point is calculated based on the road condition at each point. When the curve control means determines that the vehicle is going through the curve where the vehicle needs to turn by a predetermined amount or more, the curve control means sets a driving force appropriate for going through the curve. When the end-point control means determines that the vehicle is running toward the end point of the curve, the end-point control means sets a driving force appropriate for passing the end point of the curve. The selection control means selects the maximum driving force, among the driving forces set by the starting-point control means, the curve control means, and the end-point control means.

Japanese Patent Application Publication No. JP-A-2002-122225 describes a shifting control apparatus. The shifting control apparatus executes a cooperative shifting control for an automatic transmission, based on information relating to the condition around a vehicle or the condition ahead of the vehicle. In the shifting control apparatus, a cooperative shifting control means directly determines a shift speed that should be selected, based on the information regarding the actual curvature of a road (the curvature radius R of a road) and information on the gradient of a road surface (road surface gradient $\theta R$). The cooperative shifting control means changes the shift speed to the determined shift speed. As a result, the shift speed or the speed ratio appropriate for the curvature of the road or the gradient of the road surface is achieved promptly.

When a downshift control for a transmission is executed while a vehicle goes round a curve, an optimal shift speed (speed ratio) for passing the starting point of the curve may be different from an optimal shift speed (speed ratio) for passing the end point of the curve. In most cases, the optimal shift speed for passing the end point of the curve is higher than the optimal shift speed for passing the starting point of the curve. The optimal shift speed for passing the starting point of the curve is determined based on the deceleration required to pass the starting point of the curve. The optimal shift speed for passing the end point of the curve is determined based on the driving force required to pass the end point of the curve. As a result, both the shift speeds may be different from each other. However, in conventional technologies, for example, in the technology described in the aforementioned Publication No. JP-A-2002-122225, the same shift speed is selected at the starting point of the curve, and at the end point of the curve. That is, the optimal shift speed is not necessarily selected at the starting point of the curve, and at the end point of the curve.

After the downshift control is executed to pass the starting point of the curve, upshift control may be executed to pass the end point of the curve so that the optimal braking force and the optimal driving force are provided at the starting point of the curve and at the end point of the curve. However, there is no technology that determines the time point at which the shift speed should be changed.

SUMMARY OF THE INVENTION

In view of the above, the invention provides a driving force control apparatus which changes a shift speed from an optimal shift speed for passing the starting point of a curve to an optimal shift speed for passing the end point of the curve at an optimal time point when a vehicle goes round the curve.

An aspect of the invention relates to a driving force control apparatus which includes a controller. The controller detects a curve ahead of a vehicle, sets a target vehicle speed to pass the curve, sets a starting-point shift speed to pass the starting point of the curve, and sets an end-point shift speed to pass the end point of the curve. After the controller changes a shift speed to the starting-point shift speed, the controller determines whether an additional engine brake is required at the starting-point shift speed. If the controller determines that the engine brake is not required, the controller changes the shift speed to the end-point shift speed.

Another aspect of the invention relates to a driving force control method. The driving force control method includes detecting a curve ahead of a vehicle; setting a target vehicle speed to pass the curve; setting a starting-point shift speed to pass the starting point of the curve; setting an end-point shift speed to pass the end point of the curve; determining whether an additional engine brake is required at the starting-point shift speed, after a shift speed is changed to the starting-point shift speed; and changing the shift speed to the end-point shift speed if it is determined that the engine brake is not required.

Another aspect of the invention relates to a driving force control apparatus which includes a controller. The controller detects a curve ahead of a vehicle, sets a target vehicle speed to pass the curve, sets a starting-point shift speed to pass the starting point of the curve, and sets an end-point shift speed to pass the end point of the curve. If a vehicle speed is lower than or equal to a value corresponding to the target vehicle speed after the controller changes a shift speed to the starting-point shift speed, the controller changes the shift speed to the end-point shift speed.

Another aspect of the invention relates to a driving force control method. The driving force control method includes detecting a curve ahead of a vehicle; setting a target vehicle speed to pass the curve; setting a starting-point shift speed to pass the starting point of the curve; setting an end-point shift speed to pass the end point of the curve; and changing a shift speed to the end-point shift speed if a vehicle speed is lower than or equal to a value corresponding to the target vehicle speed after the shift speed is changed to the starting-point shift speed.

With the driving force control apparatus and the driving force control method, the shift speed can be changed from the optimal shift speed for passing the starting point of the curve to the optimal shift speed for passing the end point of the curve at the optimal time point when the vehicle goes round the curve.

BRIEF DESCRIPTION OF THE DRAWINGS

The features, advantages thereof, and technical and industrial significance of this invention will be better understood by reading the following detailed description of example embodiments of the invention, when considered in connection with the accompanying drawings, in which:

FIG. 5 is a map used to calculate a target end-point shift speed in the driving force control apparatus according to the first embodiment of the invention;

FIG. 9 is a time chart showing a problem that is solved by the driving force control apparatus according to the fourth modified example of the first embodiment of the invention.

DETAILED DESCRIPTION OF THE EXAMPLE EMBODIMENTS

In the following description and the accompanying drawings, the present invention will be described in more detail with reference to example embodiments. A first embodiment of the invention will be described with reference to FIGS. 1A and 1B to FIG. 6. The embodiment relates to a driving force control apparatus which controls the driving force of a vehicle using a transmission.

In the embodiment, when a downshift control is executed while a vehicle goes round a curve, two target shift speeds (a target starting-point shift speed, and a target end-point shift speed) are calculated. When the vehicle passes the starting point of the curve, the shift speed is downshifted to the target starting-point shift speed. Then, the shift speed is changed to the target end-point shift speed. As a result, the optimal braking force (engine braking force) and the driving force can be obtained from when the vehicle passes the starting point of the curve until when the vehicle passes the end point of the curve. This improves driveability.

The time point at which the shift speed is changed from the target starting-point shift speed to the target end-point shift speed is determined based on a target turning vehicle speed, which is described later. More specifically, the shift speed is changed at the time point when a current vehicle speed is lower than or equal to the target turning vehicle speed, and the driver operates a foot brake. Thus, the shift speed is changed at the time point when an engine brake is no longer required. That is, the driver is operating the foot brake when the shift speed is changed. Therefore, if the shift speed is upshifted from the target starting-point shift speed to the target end-point shift speed, it is possible to reduce the possibility that the driver feels uncomfortable due to a change in the driving force or due to shift shock.

The configuration in this embodiment includes an automatic transmission, and a means for detecting or estimating the curvature radius R of a curve or the curvature of a curve (for example, a navigation system), as described in detail below. The automatic transmission includes a means for executing the downshift control while the vehicle goes round a curve. For example, a multi-speed automatic transmission, a continuously variable transmission (CVT), or a manual transmission with an automatic shift mode may be employed.

Figure 2:
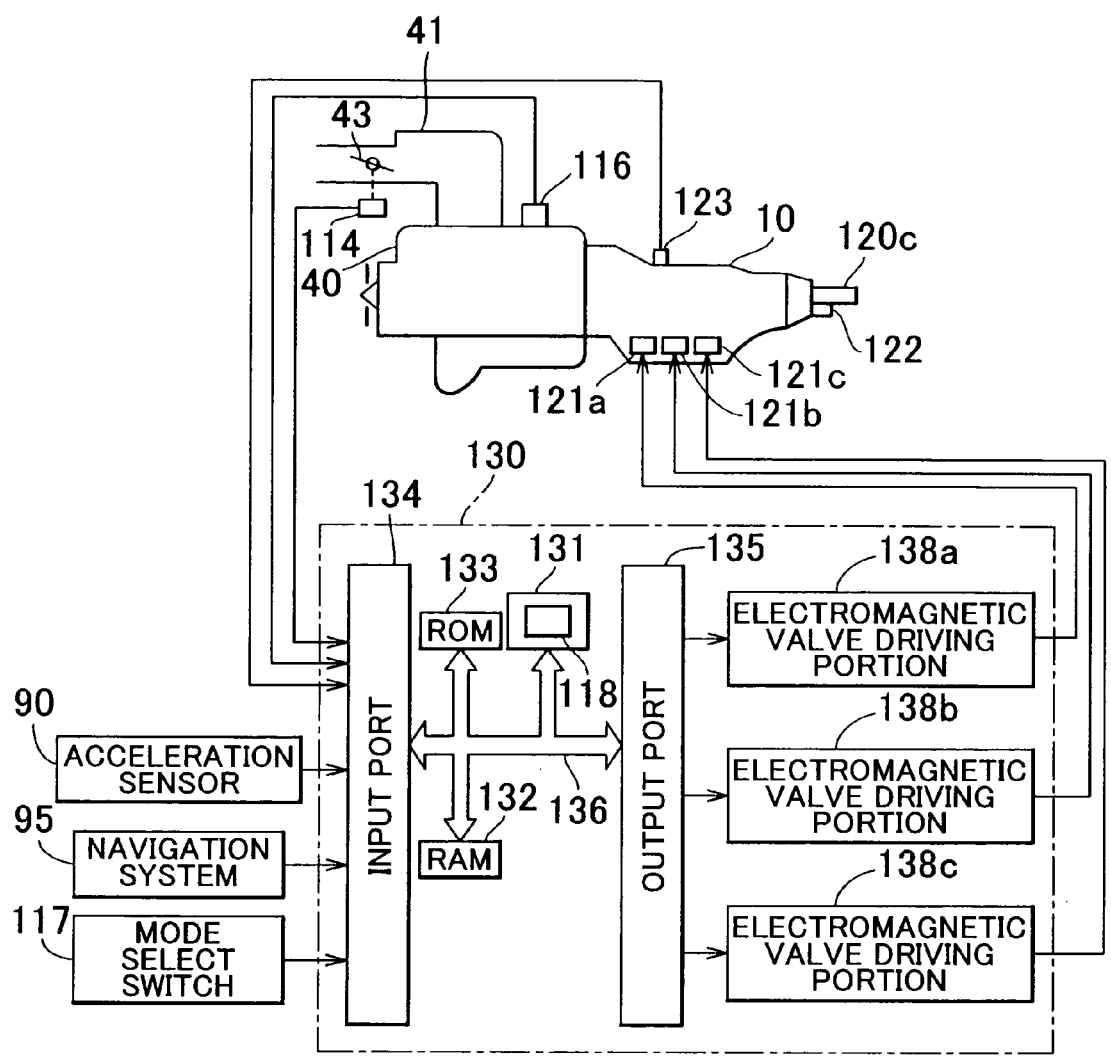
FIG. 2 is a schematic diagram showing the configuration of the driving force control apparatus according to the first embodiment of the invention.

In FIG. 2, a multi-speed automatic transmission 10, and an engine 40 are provided. Electromagnetic valves 121a, 121b, and 121c are energized or de-energized to control hydraulic pressure. As a result, any one of five shift speeds can be selected in the automatic transmission 10. In FIG. 2, the three electromagnetic valves 121a, 121b, and 121c are shown. However, the number of the electromagnetic valves is not limited to three. The electromagnetic valves 121a, 121b, and 121c are operated by signals from a control circuit 130.

A throttle-valve opening amount sensor 114 detects the opening amount of a throttle valve 43 provided in an intake passage 41 for the engine 40. An engine speed sensor 116 detects the rotational speed of the engine 40. A vehicle speed sensor 122 detects the rotational speed of the output shaft 120c of the automatic transmission 10, which is proportional to the vehicle speed. A shift position sensor 123 detects the selected shift speed. A mode select switch 117 is used to select a shift mode. An acceleration sensor 90 detects the deceleration of the vehicle.

A navigation system 95 basically guides the vehicle to a predetermined destination. The navigation system 95 includes an arithmetic processing unit, a storage medium, a first information detection device, and a second information detection device. Information required to drive the vehicle (e.g., maps, and information on straight roads, curved roads, upward/downward slopes, and express ways) is stored in the storage medium. The first information detection device detects the current position of the vehicle and the condition of the road on which the vehicle is running, by self-contained navigation. The first information detection device includes a geomagnetic sensor, a gyrocompass, and a steering sensor. The second information detection device detects the current position of the vehicle and the condition of the road on which the vehicle is running, by radio navigation. The second information detection device includes a GPS antenna and a GPS receiver.

The control circuit 130 receives signals from the throttle-valve opening amount sensor 114, the engine speed sensor 116, the vehicle speed sensor 122, the shift position sensor 123, and the acceleration sensor 90. Also, the control circuit 130 receives a signal indicating the state of the mode select switch 117, and a signal from the navigation system 95.

The control circuit 130 includes a known microcomputer. The microcomputer includes a CPU 131, RAM 132, RAM 133, an input port 134, an output port 135, and a common bus 136. The input port 134 receives signals from the aforementioned sensors 114, 116, 123, and 90, the mode select switch 117, and the navigation system 95. The output port 135 is connected to electromagnetic valve drive portions 138a, 138b, and 138c.

The CPU 131 may include a road gradient measurement/estimation portion. The road gradient measurement/estimation portion may measure or estimate a road gradient based on the acceleration detected by the acceleration sensor 90. The road gradient measurement/estimation portion may compare the actual acceleration detected by the acceleration sensor 90 and an acceleration on a flat road that is stored in the ROM 133 in advance, thereby determining the road gradient.

Figure 1A:
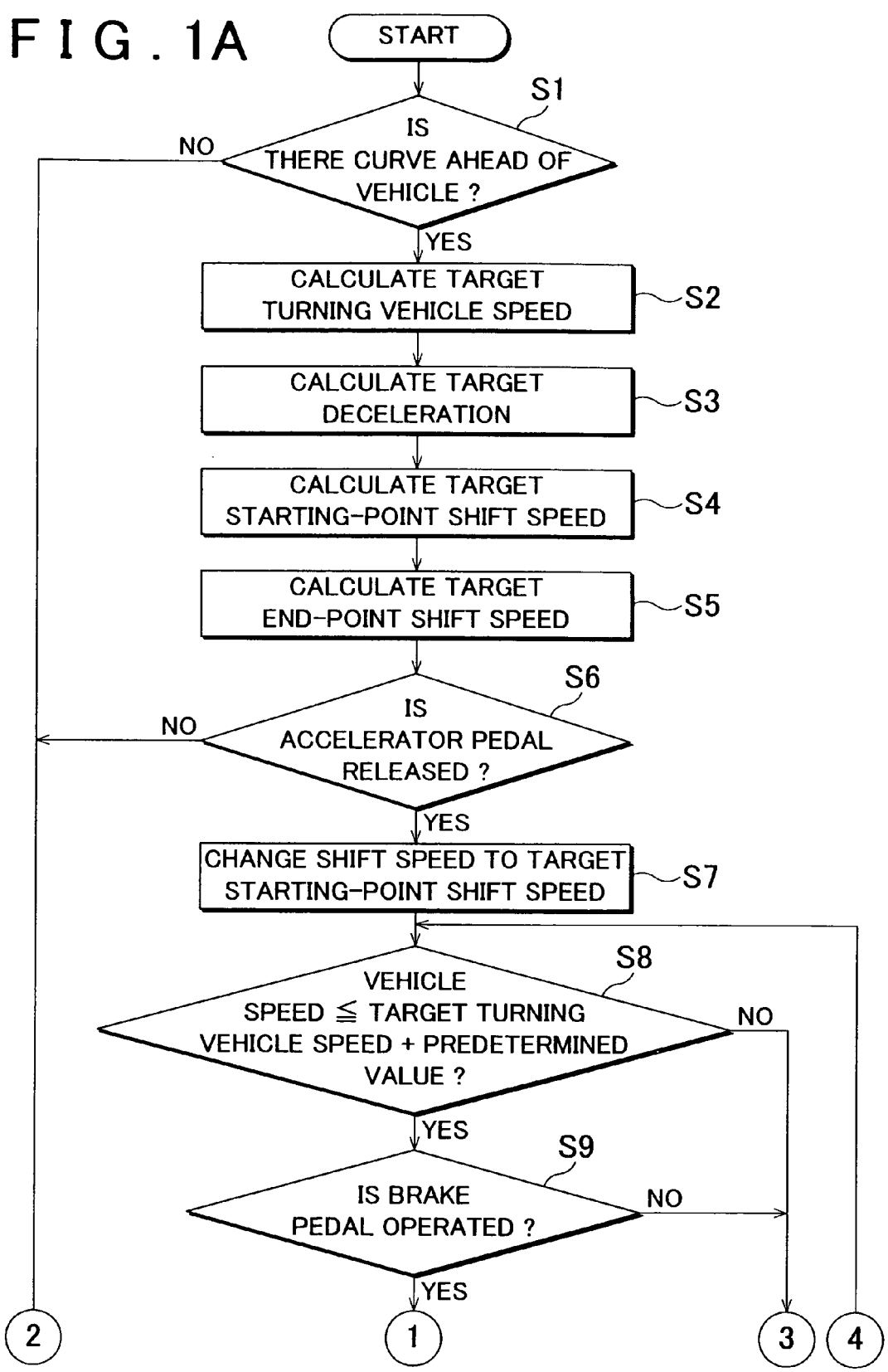
FIGS. 1A and 1B are flowcharts showing the operation of a driving force control apparatus according to a first embodiment of the invention.
Figure 1B:
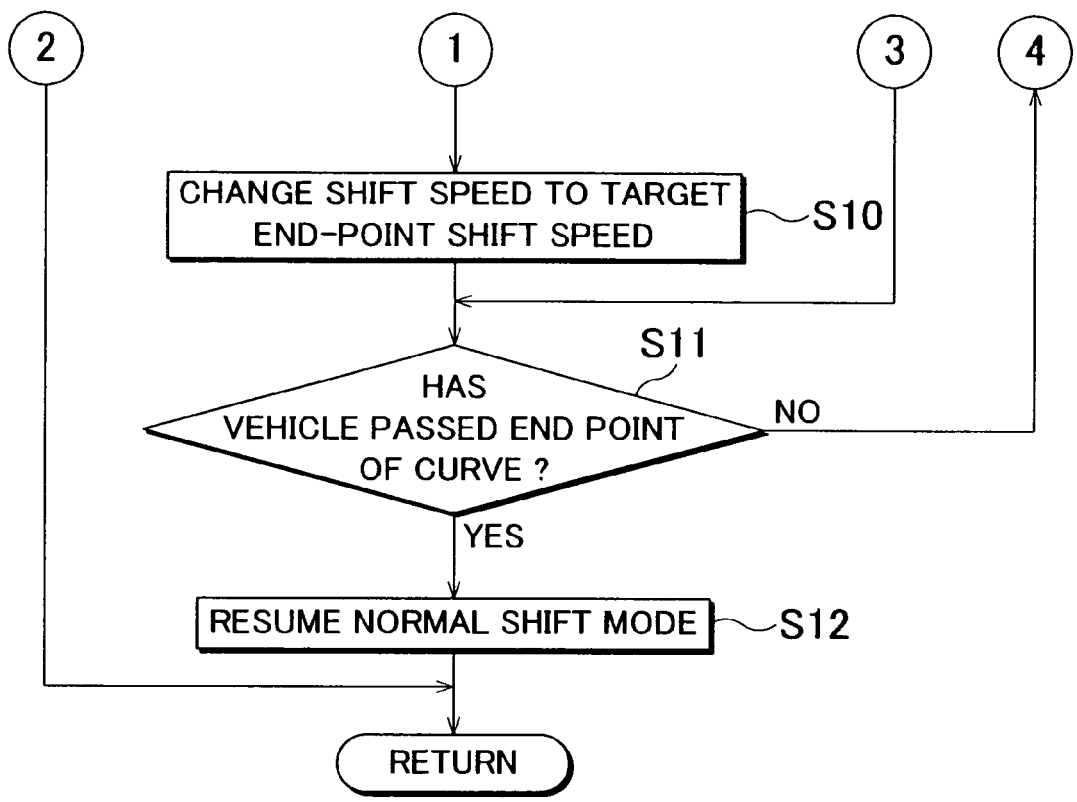
Figure 4:
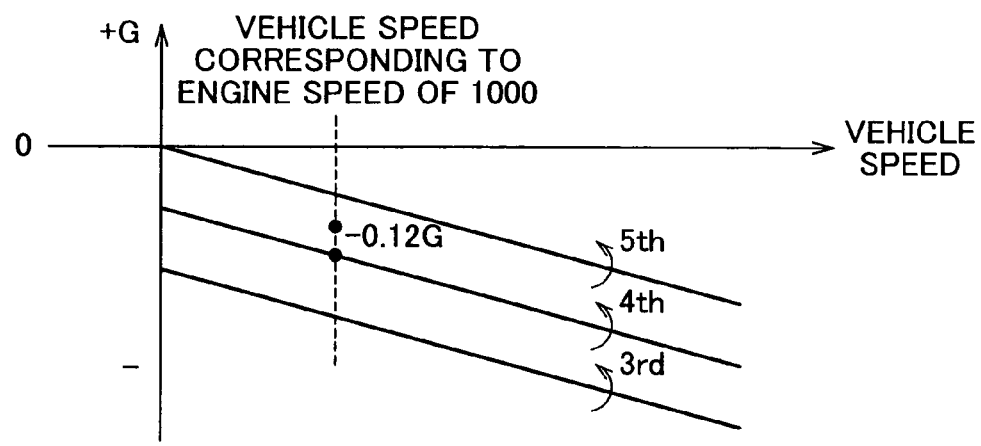
FIG. 4 is a diagram showing each shift speed corresponding to a vehicle speed and a deceleration.

In the ROM 133, a program for the operation of a driving force control apparatus (i.e., control steps) shown in a flowchart in FIGS. 1A and 1B, and maps in FIG. 4 and FIG. 5 are stored. Also, a program for the operation during the shifting control (not shown) is stored. The control circuit 130 executes the shifting control for the automatic transmission 10 based on various control conditions that are input to the control circuit 130.

The operation of the driving force control apparatus in this embodiment will be described with reference to FIGS. 1A and 1B to FIG. 3. In this embodiment, the target end-point shift speed is higher than the target starting-point shift speed.

Figure 3:
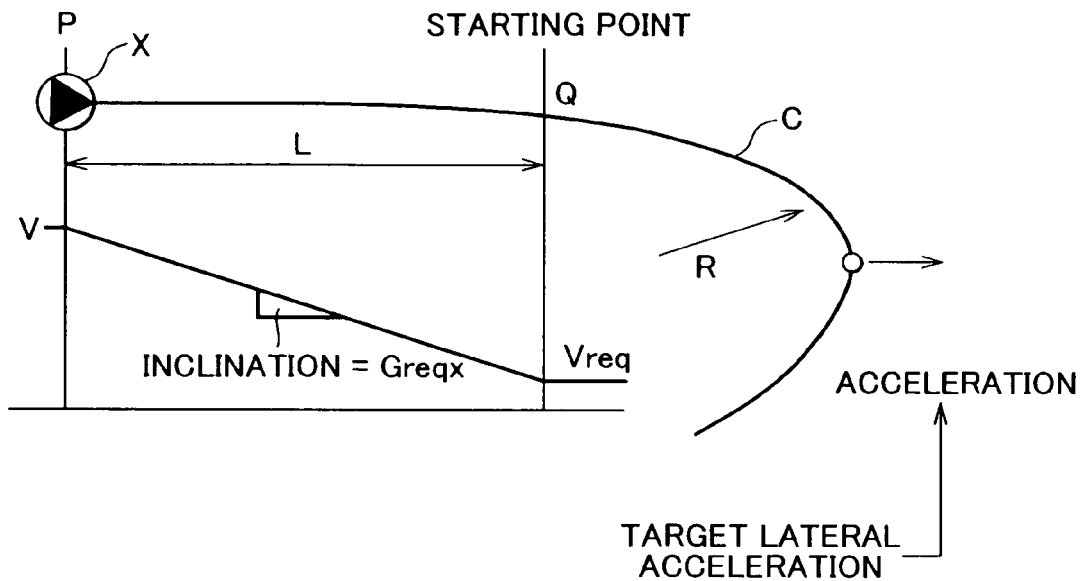
FIG. 3 is a diagram explaining a curve control executed by the driving force control apparatus according to the first embodiment of the invention.

FIG. 3 is a diagram explaining the target deceleration that is set to pass the starting point of the curve. In FIG. 3, "X" is the vehicle, "P" is the current position of the vehicle X, "C" is a curve ahead of the vehicle X, "Q" is the starting point of the curve C, "R" is the curvature radius of the curve C, "L" is the distance between the current position P and the starting point Q of the curve C, "V" is the current vehicle speed of the vehicle X, "Vreq" is the target turning vehicle speed that is set to go round the curve C at a target lateral acceleration, and "Greqx" is the deceleration required to decrease the current vehicle speed V of the vehicle X so that the vehicle speed becomes equal to the target turning vehicle speed Vreq at the starting point Q of the curve C (i.e., "Greqx" is the target deceleration that should be applied to the vehicle X during a curve control). The target lateral acceleration is the target value of the lateral acceleration, at which the vehicle X should go round the curve C. The target lateral acceleration is set to, for example, 0.3 G to 0.4 G in advance.

In step S1 in FIG. 1A, the control circuit 130 determines whether there is a curve ahead of the vehicle X, based on the signal from the navigation system 95. If the control circuit 130 determines that there is a curve ahead of the vehicle X in step S1, the routine proceeds to step S2. If the control circuit 130 determines that there is no curve ahead of the vehicle X in step S1, the routine is terminated. In the example in FIG. 3, because there is the curve C ahead of the vehicle X, the routine proceeds to step S2.

In step S2, the control circuit 130 calculates the target turning vehicle speed Vreq at which the vehicle X should go round the curve C. When calculating the target turning vehicle speed Vreq, first, the control circuit 130 calculates the curvature radius R of the curve C based on the map information of the navigation system 95. Next, the control circuit 130 determines the distance L between the current position P and the starting point Q of the curve C, and the current vehicle speed V, based on the signal from the navigation system 95. Next, the control circuit 130 calculates the target turning vehicle speed Vreq (the target vehicle speed at the starting point of the curve), based on the target lateral acceleration that is set in advance, and the curvature radius R of the curve C.

More specifically, the control circuit 130 calculates the target turning vehicle speed Vreq [n/s] according to the following equation 1.

$$Vreq = \sqrt{R \times Gyt \times g} \quad (1)$$

In this equation (1), "R" represents the curvature radius [m] of the curve, "Gyt" represents the target lateral acceleration that is set in advance (for example, 0.4 G), and "g" represents a gravitational acceleration, 9.8 [M/s$^2$]. After step S2 is executed, step S3 is executed.

In step S3, the control circuit 130 calculates the target deceleration, based on the distance L between the current position P and the starting point Q of the curve C, the vehicle speed V at the current position P, and the target turning vehicle speed Vreq at the starting point Q of the curve C. The target deceleration Greqx is calculated according to the following equation (2).

$$Greqx = \frac{V^2 - Vreq^2}{2 \times L \times g} \quad (2)$$

In this equation (2), "V" represents the current vehicle speed [m/s], and "L" represents the distance [m] between the vehicle and the starting point of the curve. After step S4 is executed, step S3 is executed.

In step S4, the control circuit 130 determines the target starting-point shift speed (i.e., the shift speed that should be selected when the shifting control is executed to pass the starting point of the curve), based on the target deceleration determined in step S3. Data on the characteristic of the vehicle is stored in the ROM 133 in advance. The data indicates the deceleration that changes in accordance with the vehicle speed at each shift speed when an accelerator pedal is released, as shown in FIG. 4.

The case where the output engine speed is 1000 [rpm], and the target deceleration is −0.12 G will be described. FIG. 4 shows that the deceleration is closest to the target deceleration of −0.12 G at the vehicle speed corresponding to the output engine speed of 1000 [rpm] when a fourth speed is selected. Thus, in this case, the fourth speed is selected as the target starting-point shift speed.

In this case, the shift speed at which the deceleration is closest to the target deceleration is selected as the target starting-point shift speed. However, the shift speed at which the deceleration is larger than and closest to the target deceleration, or the shift speed at which the deceleration is smaller than and closest to the target deceleration may be selected as the target starting-point shift speed. Also, in the aforementioned case, the target starting-point shift speed is determined by comparing the engine braking force and the target deceleration at each shift speed. However, instead of determining the target starting-point shift speed in the aforementioned manner, the target starting-point shift speed may be determined based on the target deceleration, using a map (not shown) set in advance, which defines the relation between the target starting-point shift speed and the target deceleration. After step S4 is executed, step S5 is executed.

In step S5, the control circuit 130 determines the target end-point shift speed-(i.e., the shift speed that should be selected when the shifting control is executed to pass the end point of the curve). In this case, the target end-point shift speed is determined, using, for example, a map set in advance as shown in FIG. 5. Using the map in FIG. 5, the target end-point shift speed is determined based on the curvature of a curve, and the road gradient. When the vehicle passes the end point of a curve on an upward slope, a driving force is generally required. When the vehicle passes the end point of a hairpin curve, the vehicle speed decreases, and therefore a driving force is required. Thus, the map in FIG. 5 is set.

In the aforementioned case, the target end-point shift speed is determined based on the curvature and the road gradient. However, the method of determining the target end-point shift speed is not limited to a specific method. That is, it is possible to employ any method that selects the shift speed corresponding to the driving force required to pass the end point of the curve as the target end-point shift speed. After step S5 is executed, step S6 is executed.

In step S6, the control circuit 130 determines whether an idle contact is closed. In this embodiment, when the idle contact is closed (i.e., when an accelerator-pedal operation amount is "0"), it is determined that the driver intends to decelerate the vehicle. That is, in step S6, the control circuit 130 determines whether the accelerator pedal is released based on the signal from the throttle-valve opening amount sensor 114. If the control circuit 130 determines that the accelerator pedal is released in step S6, the routine proceeds to step S7. If the control circuit 130 determines that the accelerator pedal is not released, the routine returns to step S1.

In step S7, the control circuit 130 outputs a shifting command relating to the target starting-point shift speed determined in step S4. That is, the CPU 131 of the control circuit 130 outputs a downshift command (shifting command) to the electromagnetic valve drive portions 138a to 138c. In response to the downshift command, the electromagnetic valve drive portions 138a to 138c energize or de-energize the electromagnetic valves 121a to 121c, respectively. As a result, in the automatic transmission 10, the shift speed is downshifted to the target starting-point shift speed indicated by the downshift command. Downshifting to the target starting-point shift speed increases the engine braking force (deceleration), and decreases the vehicle speed. After step S7 is executed, step S8 is executed.

In step S8, the control circuit 130 determines whether the vehicle speed is lower than or equal to the sum of the target turning vehicle speed Vreq and a predetermined value. When it is not necessarily appropriate to use the target turning vehicle speed Vreq as the threshold value for the vehicle speed in step S8, the predetermined value is used to adjust the target turning vehicle speed Vreq. That is, the threshold value is set to the optimal value near the target turning vehicle speed Vreq, using the predetermined value. The threshold value is the sum of the target turning vehicle speed Vreq and the predetermined value. The threshold value corresponds to the target turning vehicle speed Vreq. If an affirmative determination is made in step S8, the routine proceeds to step S9. If a negative determination is made in step S8, the routine proceeds to step S11.

If an affirmative determination is made in step S8, the vehicle does not need decelerate to go round the curve (i.e., to pass the starting point of the curve). Therefore, if another condition in step S9 is satisfied, the shift speed is changed to the target end-point shift speed in step S10, as described below.

The predetermined value may be changed, for example, based on the curvature radius of the curve. In this case, the predetermined value decreases as the curvature radius of the curve decreases. In the situation where the deceleration control is finished when the vehicle speed reaches the target turning vehicle speed Vreq, the driver may feel uncomfortable (i.e., the driver may feel that the vehicle is excessively decelerated) if the curvature radius of the curve is large. By decreasing the predetermined value as the curvature of the curve decreases, the possibility that the driver feels uncomfortable can be effectively reduced.

In step S9, the control circuit 130 determines whether the driver is operating a foot brake. If the control circuit 130 determines that the foot brake is operated, the routine exceeds to step S10. If the control circuit 130 determines that the foot brake is not operated, the routine proceeds to step S11.

In step S10, the control circuit 130 outputs the shifting command relating to the target end-point shift speed determined in step S5. That is, the CPU 131 of the control circuit 130 outputs the shifting command to the electromagnetic valve drive portions 138a to 138c. As a result, in the automatic transmission 10, the shift speed is changed to the target end-point shift speed indicated by the shifting command. By changing the shift speed to the target end-point shift speed, the driving force suitable for passing the end point of the curve is generated. After step S10 is executed, step S11 is executed.

In step S11, the control circuit 130 determines whether the vehicle has passed the end point of the curve, based on the information from the navigation system 95. If the control circuit 130 determines that the vehicle has passed the end point of the curve, the routine proceeds to step S12. If the control circuit 130 determines that the vehicle has not passed the end point of the curve, the routine returns to step S8.

In step S12, the control circuit 130 resumes the shifting control in a normal shift mode. In the normal shift mode, the shift speed is selected based on the accelerator-pedal operation amount and the vehicle speed, using an ordinary shift map. After step S12 is executed, the routine returns to step S1.

If the vehicle speed is higher than the threshold value near the target turning vehicle speed Vreq (NO in step S8), or if the foot brake is not operated (NO in step S9) before the vehicle passes the end point of the curve (NO in step S11), the shift speed is not changed to the target end-point shift speed (i.e., step S10 is not executed). That is, only when the vehicle speed is lower than or equal to the threshold value near the target turning vehicle speed Vreq (YES in step S8) and the foot brake is operated (YES in step S9), the shift speed is changed to the target end-point shift speed (i.e., step S10 is executed).

If the vehicle has passed the end point of the curve (YES in step S11) before the vehicle speed decreases to a value lower than or equal to the threshold value near the target turning vehicle speed Vreq (NO in step S8) or before the driver operates the foot brake (NO in step S9), the shift speed is not changed to the target end-point shift speed (i.e., step S10 is not executed), and the normal shift mode is resumed (step S12).

Figure 6:
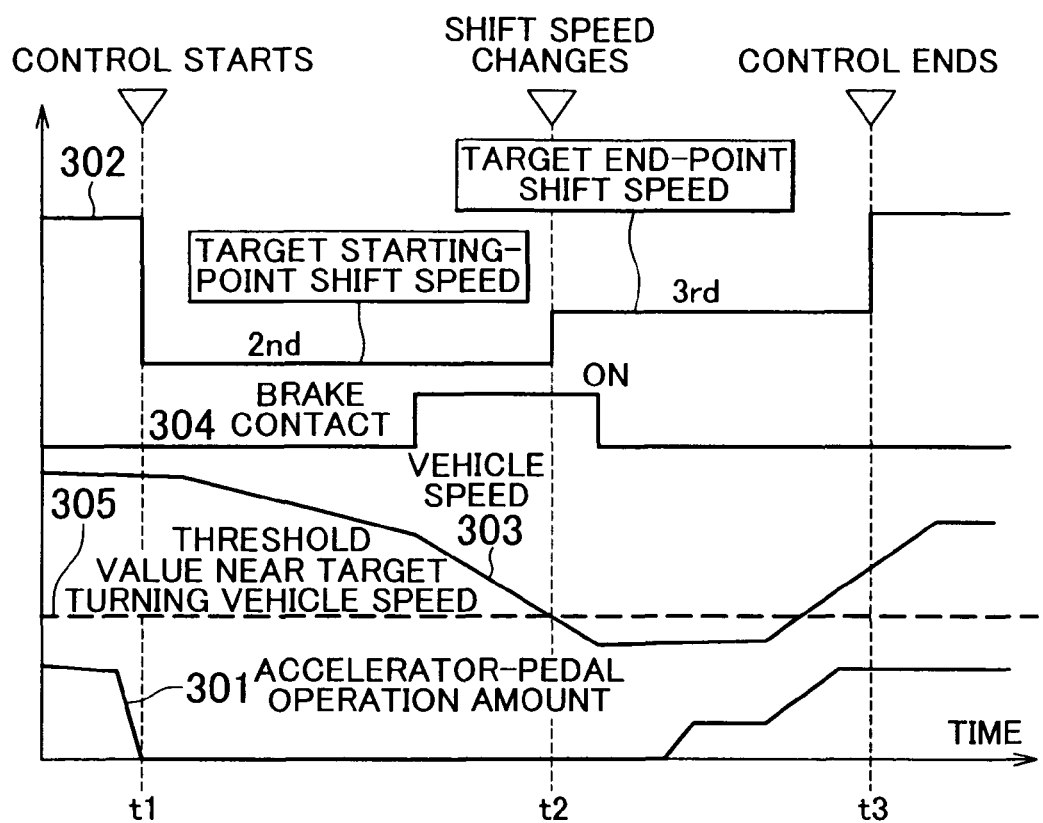
FIG. 6 is a time chart showing the operation of the driving force control apparatus according to the first embodiment of the invention.

Next, the operation of the driving force control apparatus in this embodiment will be described with reference FIG. 6. When it is determined that the accelerator-pedal operation amount 301 is "0" at time point t1 (YES in step S6), the shift speed 302 of the automatic transmission 10 is changed to the target starting-point shift speed determined in step S4 (step S7). In this example, the target starting-point shift speed is set to a second speed. When the accelerator-pedal operation amount 301 is "0", the shift speed 302 is downshifted to the second speed, which decreases the vehicle speed 303.

Subsequently, when the vehicle approaches the starting point of the curve, the driver operates the foot brake so that a brake contact 304 is closed (YES in step S9). This further decreases the vehicle speed 303. Then, after the vehicle speed 303 reaches the threshold value 305 near the target turning vehicle speed Vreq (YES in step S8) at time point t2, the shift speed 302 is changed (upshifted) to the target end-point shift speed, that is, the third speed (step S10). Then, after it is determined that the vehicle has passed the end point of the curve at time point t3 (YES in step S11), the shifting control in the normal shift mode is resumed (step S12). As a result, the shift speed 302 is upshifted in this example.

In this embodiment, the following effects can be obtained.

(1) Two target shift speeds (i.e., the target starting-point shift speed and the target end-point shift speed) are determined (step S4 and step S5). The shift speed is downshifted to the target starting-point shift speed to pass the starting point of the curve (step S7). Then, the shift speed is changed to the target end-point shift speed (step S10). As a result, the optimal braking force (engine braking force) and the optimal driving force can be obtained from when the vehicle passes the starting point of the curve until when the vehicle passes the end point of the curve. This improves driveability.

(2) By determining the time point at which the vehicle speed is lower than or equal to the threshold value near the target turning vehicle speed Vreq (step S8), the time point at which the engine brake is no longer required to go round the curve can be determined. At this optimal time point, the shift speed can be changed from the target starting-point shift speed to the target end-point shift speed (step S10).

(3) Also, in this embodiment, if the vehicle speed is lower than or equal to the threshold value near the target turning vehicle speed Vreq (YES in step S8), and the foot brake is operated (YES in step S9), the shift speed is changed from the target starting-point shift speed to the target end-point shift speed (step S10). When the foot brake is operated, the total deceleration applied to the vehicle is increased by the amount of deceleration caused by the operation of the foot brake. Therefore, even if the deceleration is decreased by upshifting from the target starting-point shift speed to the target end-point shift speed, the amount by which the deceleration is decreased due to the upshifting constitutes only a small proportion of the total deceleration. Accordingly, by changing the shift speed from the target starting-point shift speed to the target end-point shift speed when the foot brake is operated, it is possible to reduce the possibility that the driver feels much uncomfortable due to a change in the driving force or due to shift shock during upshifting. In this embodiment, the shift speed can be changed from the target starting-point shift speed to the target end-point shift speed at the optimal time point for the reason described in this paragraph (3).

In step S4 in the first embodiment, the target starting-point shift speed is determined based on the target deceleration (step S3). However, the method of determining the target starting-point shift speed is not limited to this method. It is possible to employ any method that determines the target starting-point shift speed taking into account the deceleration required to pass the starting point of the curve. For example, the target starting-point shift speed may be determined based on the size of the curve (i.e., curvature), or based on a map in which the size of the curve and the road gradient are used as parameters. Also, the method of determining the target end-point shift speed is not limited to the aforementioned method used in step S5. It is possible to employ any method that determines the target end-point shift speed taking into account the deceleration required to pass the end point of the curve.

For example, if the target starting-point shift speed and the target end-point shift speed are determined using the respective maps in which the size of the curve and the road gradient are used as parameters, the values of the target shift speed corresponding to the parameters in the map for the target starting-point shift speed are different from those in the map for the target end-point shift speed. That is, in the map for the target starting-point shift speed, the values of the target shift speed are set taking into account the deceleration required to pass the starting point of the curve. In the map for the target end-point shift speed, the values of the target shift speed are set taking into account the deceleration required to pass the end point of the curve.

Next, a first modified example of the first embodiment will be described. In the first embodiment, after the shift speed is changed to the target starting-point shift speed (step S7), if the vehicle speed is lower than or equal to the threshold value near the target turning vehicle speed (YES in step S8), and the foot brake is operated (YES in step S9), the shift speed is changed to the target end-point shift speed (step S10). In this modified example, instead, after the shift speed is changed to the target starting-point shift speed (step equivalent to step S7), if the vehicle speed is lower than or equal to the threshold value near the target turning vehicle speed (YES in step equivalent to step S8) and the accelerator pedal is operated, the shift speed is changed to the target end-point shift speed. By detecting the operation of the accelerator pedal (i.e., by determining that the driver intends to accelerate the vehicle), it can be accurately determined that the driver does not need the engine brake.

Next, a second modified example of the first embodiment will be described. In the first embodiment, after the shift speed is changed to the target starting-point shift speed (step S7), if the vehicle speed is lower than or equal to the threshold value near the target turning vehicle speed (YES in step S8), and the foot brake is operated (YES in step S9), the shift speed is changed to the target end-point shift speed (step S10). In this modified example, instead, after the shift speed is changed to the target starting-point shift speed (step equivalent to step S7), if the vehicle speed is lower than or equal to the threshold value near the target turning vehicle speed (YES in step equivalent to step S8), the shift speed is changed to the target end-point shift speed.

In this modified example, it can be determined whether the necessity of the engine brake is reduced, based on the vehicle speed. Therefore, the shift speed can be changed to the target end-point shift speed at the time point at which it is determined that the necessity of the engine brake is reduced. Unlike the first embodiment, even if the vehicle speed is decreased to a value lower than or equal to the threshold value near the target turning vehicle speed only by the engine brake and without operating the foot brake, the shift speed is changed to the target end-point shift speed.

Next, a third modified example of the first embodiment will be described. with reference to FIGS. 7A and 7B. This modified example is equivalent to the combination of the first embodiment and the second modified example of the first embodiment. In the first embodiment, if the vehicle speed is decreased to a value lower than or equal to the threshold value near the target turning vehicle speed without operating the foot brake (YES in step S8, NO in step S9), the shift speed is not changed to the target end-point shift speed (i.e., step S10 is not executed). If the vehicle speed is decreased to a value lower than or equal to the threshold value near the target turning vehicle speed by operating the foot brake, the shift speed is changed to the target end-point shift speed. This reduces the possibility that the driver feels uncomfortable due to a change in the driving force or due to shift shock during upshifting. In the second modified example, even if the vehicle speed is decreased to a value lower than or equal to the threshold value near the target turning vehicle speed only by the engine brake and without operating the foot brake, the shift speed is changed to the target end-point shift speed. Accordingly, in this modified example, the shift speed is changed to the target end-point shift speed at the optimal time point, regardless of whether the foot brake is operated.

Figure 7A:
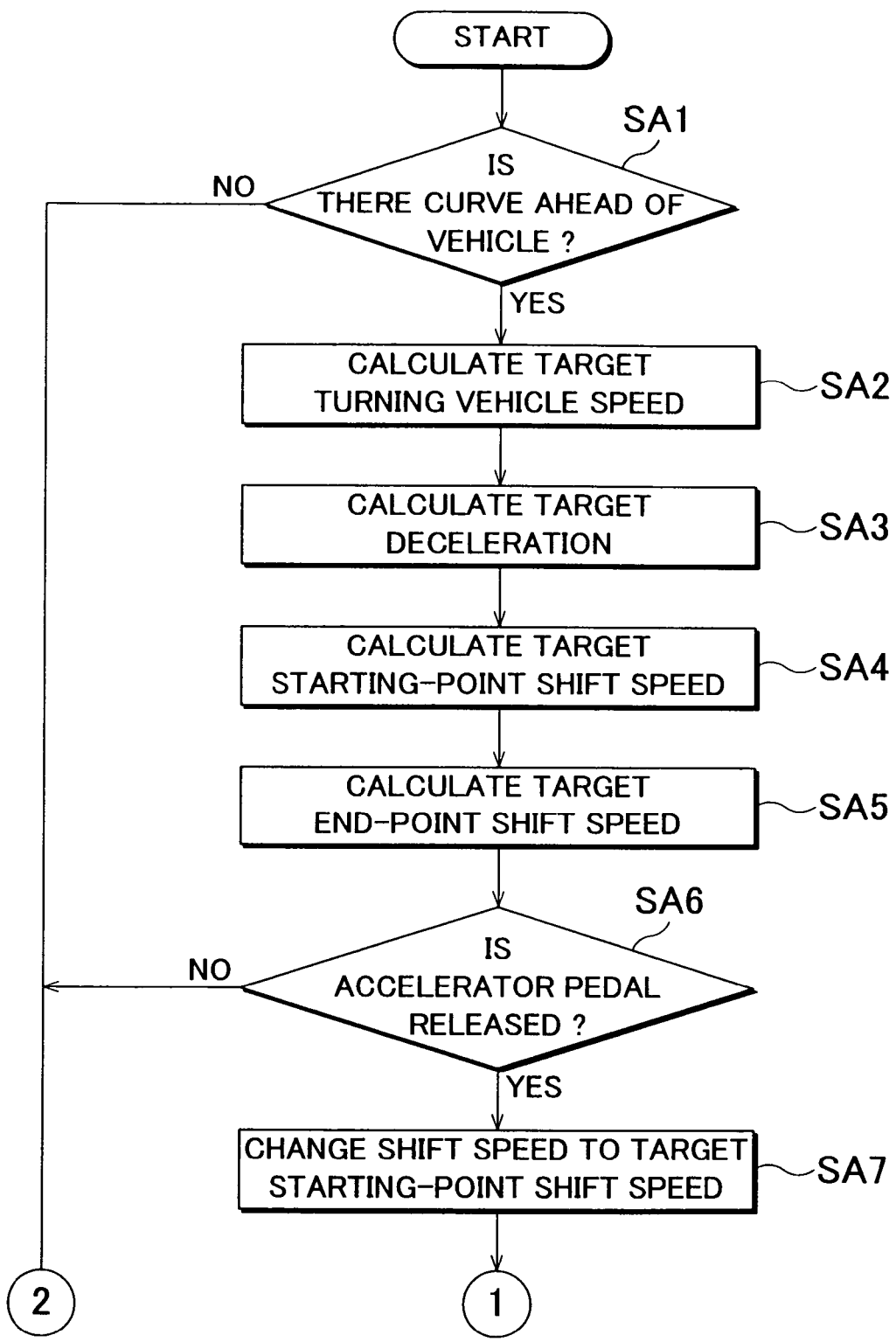
FIGS. 7A and 7B are flowcharts showing the operation of a driving force control apparatus according to a third modified example of the first embodiment of the invention.
Figure 7B:
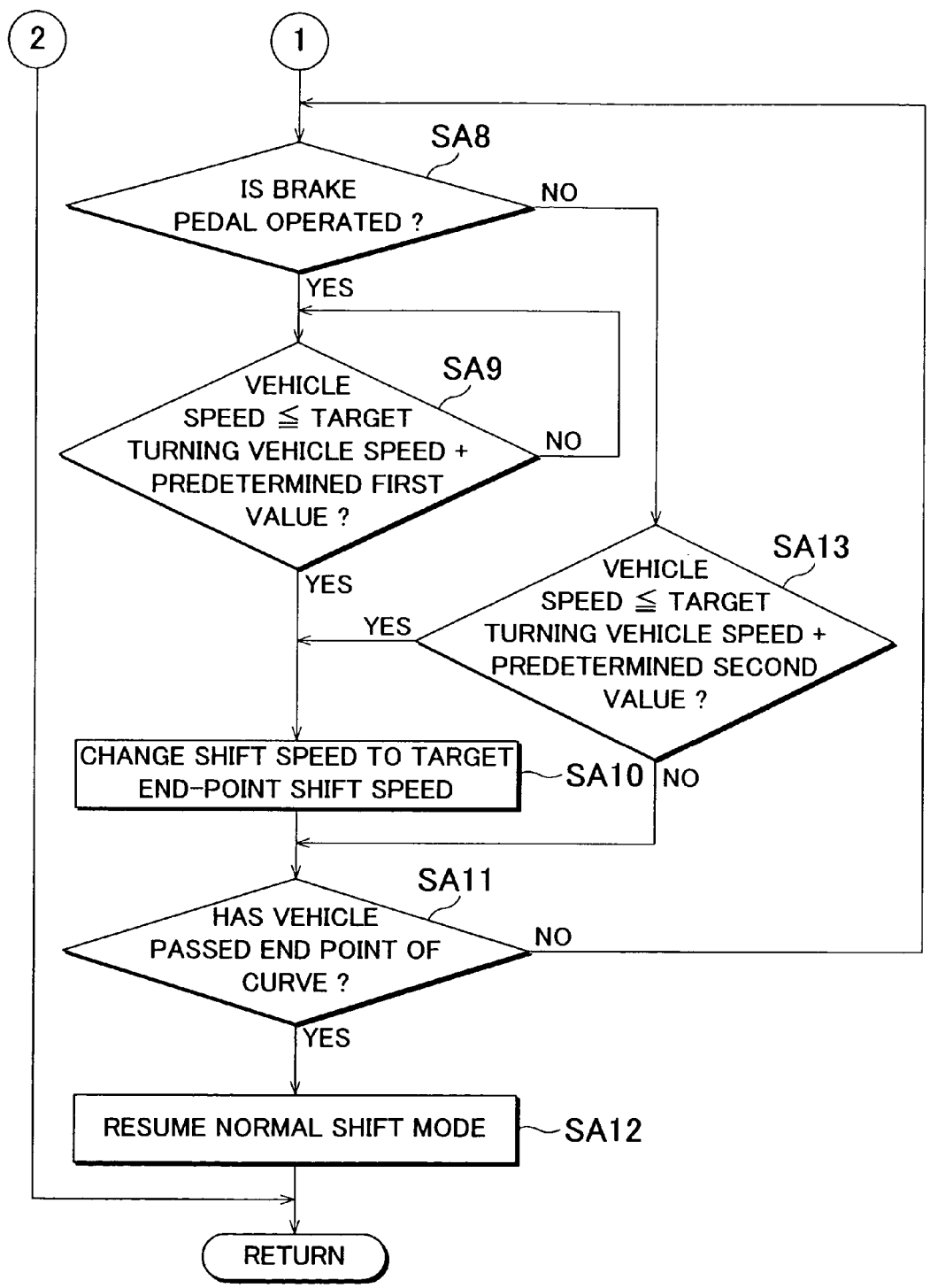

In FIG. 7A, steps SA1 to SA7 are the same as steps S1 to S7 in FIG. 1A. Steps SA10 to SA12 are the same as steps S10 to S12 in FIG. 1B. Therefore, description thereof will be omitted.

In step SA8, it is determined whether the driver is operating the foot brake, as in step S9 in FIG. 1A. If an affirmative determination is made in step SA8, the routine proceeds to step SA9. If a negative determination is made in step SA8, the routine proceeds to step SA13.

In step SA9, the control circuit 130 determines whether the vehicle speed is lower than or equal to a first predetermined value near the target turning vehicle speed Vreq. If an affirmative determination is made in step SA9, the routine proceeds to step SA10. If a negative determination is made in step SA9, the routine returns to step SA9.

If an affirmative determination is made in step SA9, the vehicle does not need to decelerate to go round the curve. Therefore, the shift speed is changed to the target end-point shift speed in step SA10, as described below.

In step SA13, the control circuit 130 determines whether the vehicle speed is lower than or equal to a second predetermined value near the target turning vehicle speed Vreq. If an affirmative determination is made in step SA13, the routine proceeds to step SA10. If a negative determination is made in step SA13, the routine proceeds to step SA11.

The second predetermined value near the target turning vehicle speed Vreq is lower than or equal to the first predetermined value near the target turning vehicle speed Vreq, which is used in step SA9. Thus, after it is determined that the foot brake is not operated (NO in step SA8), the condition for changing the shift speed is satisfied (YES in step SA13) at a time point later than the time point at which the condition for changing the shift speed is satisfied (YES in step SA9) after it is determined that the foot brake is operated (YES in step S8). This reduces the possibility that the driver operates the foot brake after the condition for changing the shift speed is satisfied in step SA13. This configuration is made to increase the likelihood of detecting the operation of the foot brake. By detecting the operation of the foot brake (YES in step SA8), it can be more accurately determined that the engine brake is not required.

When an affirmative determination is made in step SA13 after it is determined that the foot brake is not operated (NO in step SA8), the vehicle speed is lower than that when an affirmative determination is made in step SA9. Therefore, even after it is determined that the foot brake is not operated (NO in step SA8), it can be determined that the engine brake is not required. Accordingly, if an affirmative determination is made in step SA13, the shift speed can be changed to the target end-point shift speed.

Figure 8A:
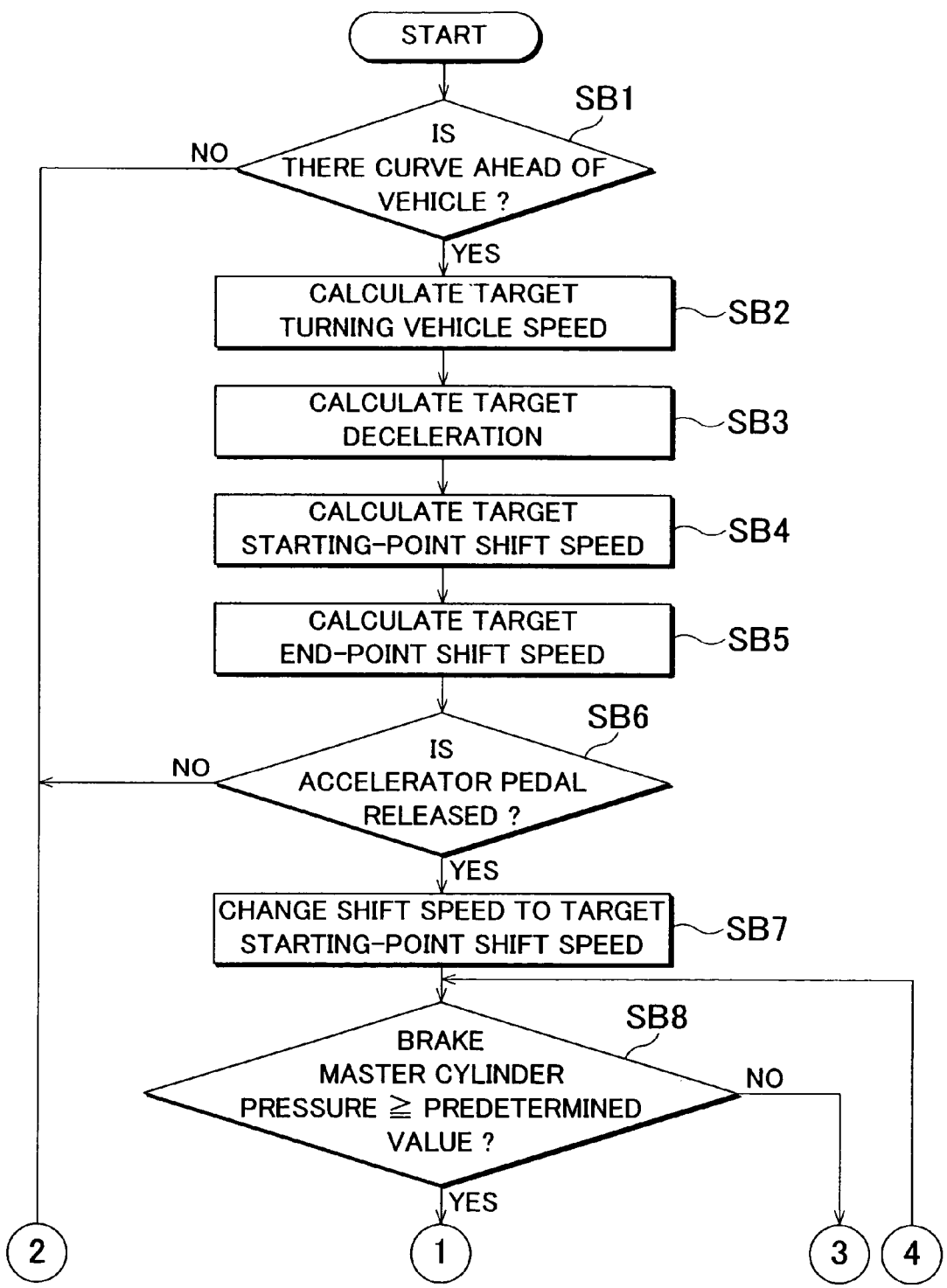
FIGS. 8A and 8B are flowcharts showing the operation of a driving force control apparatus according to a fourth modified example of the first embodiment of the invention.
Figure 8B:
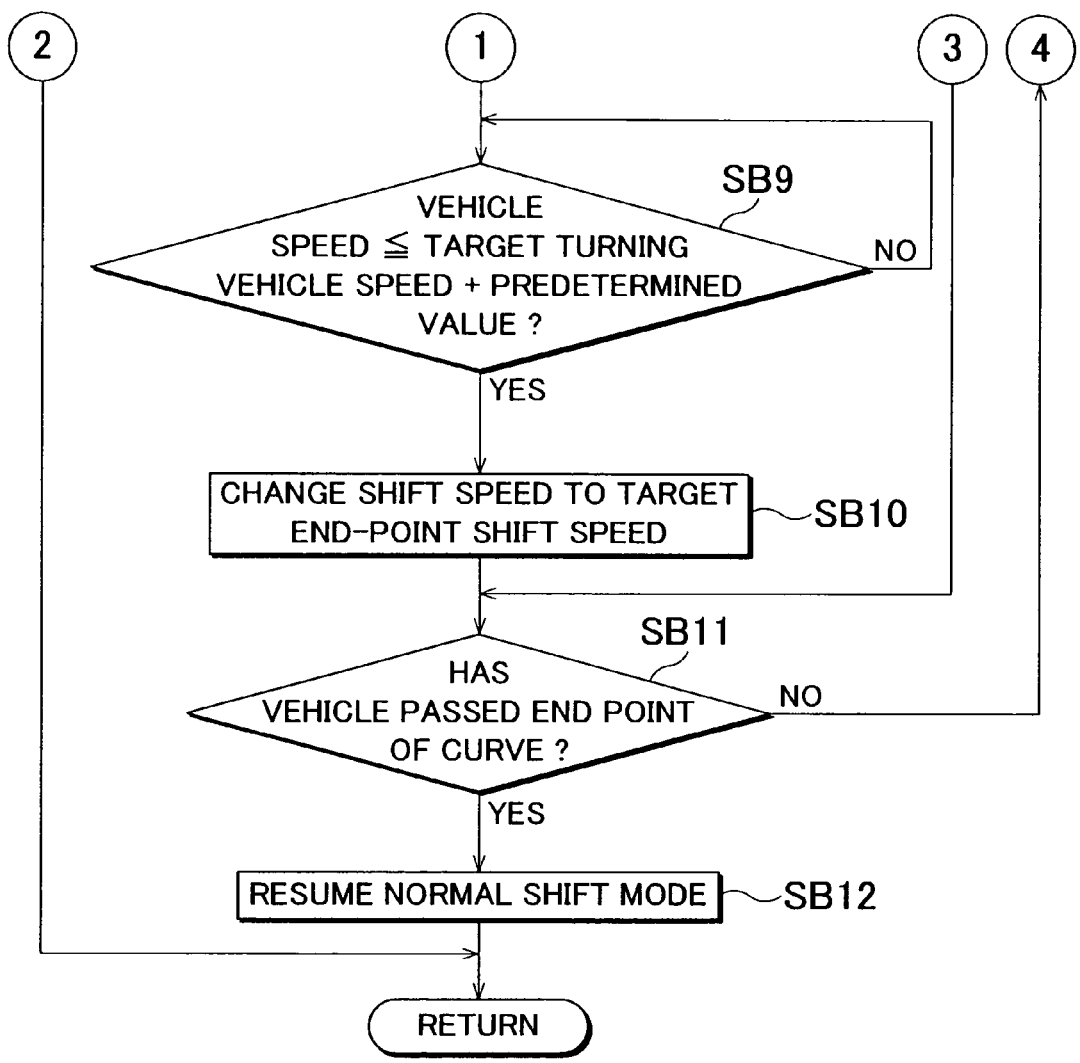

Next, the fourth modified example of the first embodiment will be described with reference to FIGS. 8A and 8B to FIG. 10. In the first embodiment, after the shift speed is changed to the target starting-point shift speed (step S7), if the vehicle speed is lower than or equal to the threshold value near the target turning vehicle speed (YES in step S8), and the foot brake is operated (YES in step S9), the shift speed is changed to the target end-point shift speed (step S10). In this modified example, instead, after the shift speed is changed to the target starting-point shift speed (step SB7), if the vehicle speed is lower than or equal to the threshold value near the target turning vehicle speed (YES in step SB9), and a brake master cylinder pressure is higher than or equal to a predetermined value (YES in step SB8), the shift speed is changed to the target end-point shift speed, as shown in FIGS. 8A and 8B.

In the first embodiment, the deceleration decreases when the shift speed is changed (upshifted). When the shift speed is upshifted (i.e., the speed ratio decreases), the deceleration generally decreases. Further, the transmission may be placed in a neutral state and the deceleration may significantly decrease until the shift speed is completely upshifted (i.e., each engagement element is completely engaged), depending on the configuration of the transmission.

Accordingly, to prevent the significant decrease in the deceleration, the shift speed is upshifted to the target end-point shift speed when the vehicle speed is lower than or equal to the threshold value near the target turning vehicle speed and the foot brake is operated, in the first embodiment. However, the shift speed may be upshifted when the brake contact has just been closed (the foot brake has just been operated) and substantially no deceleration has been generated by the operation of the foot brake. In this case, the driver may feel uncomfortable. FIG. 9 is a diagram explaining this problem.

Next, the operation of the driving force control apparatus according to the first embodiment will be described with reference to FIG. 9. When it is determined that the accelerator-pedal operation amount 401 is "0" at time point t1 (YES in step S6), the shift speed 402 of the automatic transmission 10 is changed to the target starting-point shift speed (step S7). In this example, the target starting-point shift speed is the second speed. Thus, when the accelerator-pedal operation amount 401 is "0", the shift speed 402 is downshifted to the second speed. As a result, the actual speed 406 of the vehicle decreases (that is, the actual deceleration increases).

Then, when the vehicle approaches the starting point of the curve, the driver operates the foot brake, and the brake contact 404 is closed (YES in step S9). After the vehicle speed decreases to a value lower than or equal to the threshold value near the target turning vehicle speed (YES in step S8) at time point t2, the shift speed 402 is changed (upshifted) to the target end-point shift speed (step S10). If the brake master cylinder pressure 407 is low when the brake contact 404 is closed, the deceleration generated by the operation of the foot brake is small. Immediately after time point t2, the actual deceleration 406 is indicated by a solid line, and the deceleration generated by the engine brake is indicated by a dashed line. The hatched portion indicates the deceleration generated by the operation of the foot brake.

As shown in FIG. 9, if the shift speed is upshifted when the deceleration generated by the operation of the foot brake constitutes a small proportion of the current deceleration (the actual deceleration 406 of the vehicle), that is, when the brake master cylinder pressure 407 is low, the deceleration changes by a large percent. In the example shown in FIG. 9, the deceleration decreases by approximately 50% immediately after upshifting. Although the driver intends to decelerate the vehicle and operates the foot brake, the deceleration greatly decreases (as shown by a reference character "A" in FIG. 9). Therefore, the driver feels much uncomfortable.

Figure 10:
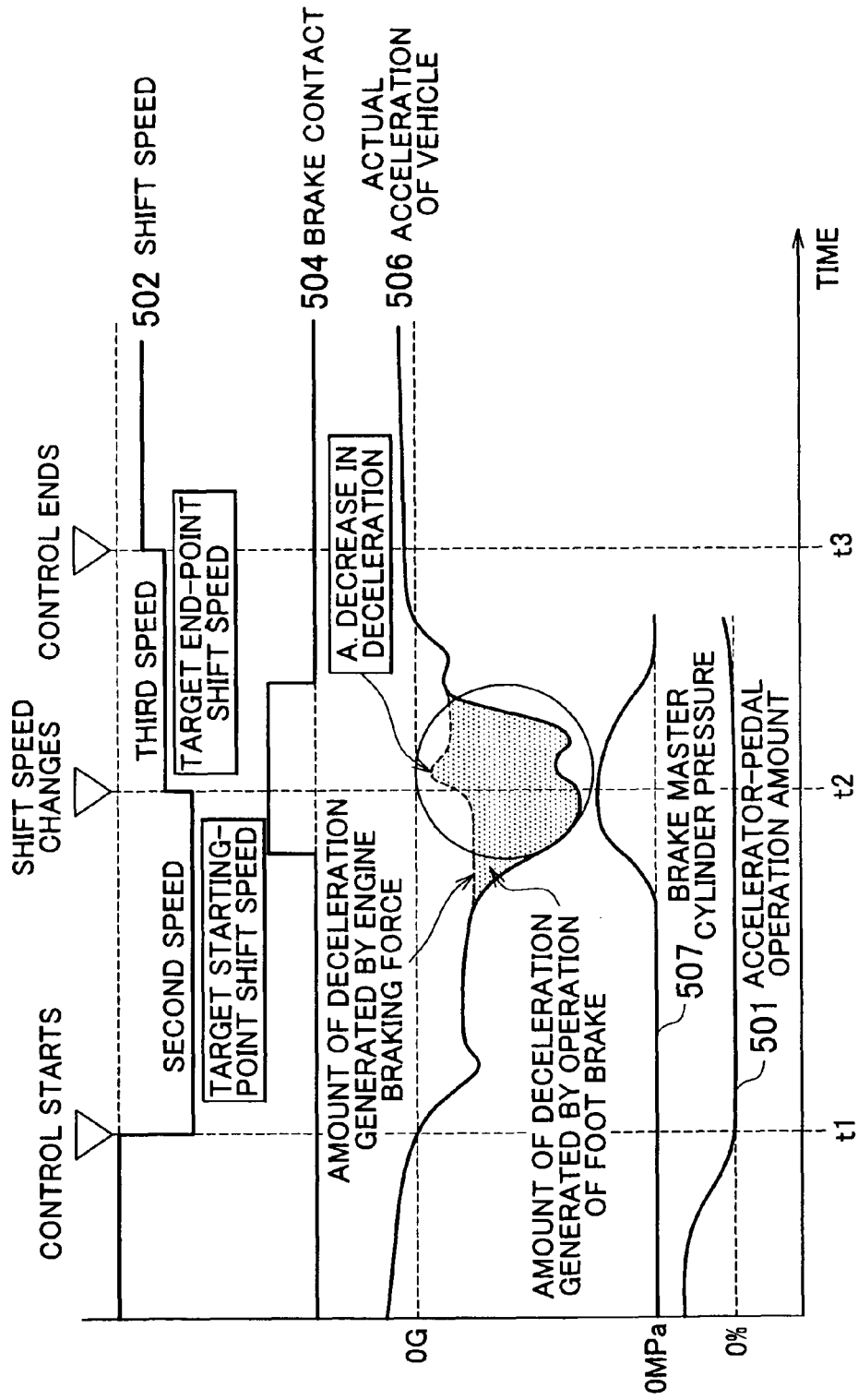
FIG. 10 is a time chart showing the effect of the driving force control apparatus according to the fourth modified example of the first embodiment of the invention.

Next, this modified example will be described with reference to FIG. 10. In this example in FIG. 10, only when the brake master cylinder pressure 507 is higher than or equal to the predetermined value (YES in step SB8), the shift speed is upshifted to the target end-point shift speed (step SB10). If the shift speed is upshifted when the deceleration generated by the operation of the foot brake constitutes a large proportion of the current deceleration (the actual deceleration 506 of the vehicle), that is, when the brake master cylinder pressure 507 is high, the deceleration changes by a small percent. In the example in FIG. 10, the deceleration decreases by approximately 15% immediately after upshifting. Accordingly, the deceleration does not greatly change, and the driver does not feel much uncomfortable. Thus, in this modified example, the shift speed is changed when a large braking force has been generated by the foot brake. This reduces the possibility that the driver feels uncomfortable due to a change in the deceleration when the shift speed is changed.

In this modified example, the shift speed is changed if the brake master cylinder pressure is higher than or equal to the predetermined value. However, instead, a means for detecting or estimating, for example, a brake pedal force, may be used to determine whether the foot brake is fully depressed. For example, the shift speed may be changed i) if the actual acceleration of the vehicle is smaller than or equal to a predetermined value when the foot brake is operated, ii) if the rate of change in the actual acceleration of the vehicle is smaller than or equal to a predetermined value (i.e., the rate of change in the actual deceleration is larger than or equal to a predetermined value, iii) a brake pedal stroke is larger than or equal to a predetermined value, or iv) if the brake pedal force is larger than or equal to a predetermined value.

As the transmission in each of the aforementioned embodiments, a continuously variable transmission may be employed. Also, in each of the aforementioned embodiments, the deceleration (G) is used to indicate the amount by which the vehicle speed needs to decrease. However, the control may be executed based on deceleration torque.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A driving force control apparatus, comprising:
a controller that
detects a curve ahead of a vehicle,
sets a target vehicle speed to pass the detected curve,
sets a starting-point shift speed based on the detected curve ahead of the vehicle, to pass a starting point of the detected curve, and
sets an end-point shift speed different from the starting-point shift speed to pass an end point of the detected curve different from the starting point of the detected curve,
wherein the controller changes a shift speed to the end-point shift speed if, after the controller changes a shift speed to the starting-point shift speed, a vehicle speed is lower than or equal to a value corresponding to the target vehicle speed and a braking member is operated.

2. The driving force control apparatus according to claim 1, wherein the controller determines whether an additional engine brake is required at the starting-point shift speed, based on whether an accelerator member is operated.

3. The driving force control apparatus according to claim 1, wherein the controller changes the shift speed to the end-point shift speed if a parameter indicating a deceleration state of the vehicle is larger than or equal to a predetermined value when the braking member is operated.

4. The driving force control apparatus according to claim 3, wherein the parameter indicating the deceleration state of the vehicle is any one of a brake master cylinder pressure, an acceleration of the vehicle, a rate of change in the acceleration of the vehicle, a brake pedal stroke, and a brake pedal force.

5. The driving force control apparatus according to claim 1, wherein the value corresponding to the target vehicle speed is a sum of a target turning vehicle speed determined based on a curvature radius of the curve and a target lateral acceleration, and a correction amount that is changed based on the curvature radius of the curve.

6. The driving force control apparatus according to claim 5, wherein the correction amount decreases as the curvature radius of the curve decreases.

7. The driving force control apparatus according to claim 1, wherein the controller does not change the shift speed to the end-point shift speed if, after the controller changes the shift speed to the starting-point shift speed, the vehicle speed is not lower than or equal to the value corresponding to the target vehicle speed or the braking member is not operated.

8. The driving force control apparatus according to claim 1 wherein the controller changes the shift speed to the end-point shift speed if a parameter indicating a deceleration state of the vehicle is larger than or equal to a predetermined value when the braking member is operated.

9. The driving force control apparatus according to claim 8, wherein the parameter indicating the deceleration state of the vehicle is any one of a brake master cylinder pressure, an acceleration of the vehicle, a rate of change in the acceleration of the vehicle, a brake pedal stroke, and a brake pedal force.

10. The driving force control apparatus according to claim 1, wherein the value corresponding to the target vehicle speed is a sum of a target turning vehicle speed determined based on a curvature radius of the curve and a target lateral acceleration, and a correction amount that is changed based on the curvature radius of the curve.

11. The driving force control apparatus according to claim 10, wherein the correction amount decreases as the curvature radius of the curve decreases.

12. The driving force control apparatus according to claim 1, wherein the end-point shift speed is set based on the detected curve ahead of the vehicle.

13. The driving force control apparatus according to claim 12, wherein
the end-point shift speed is set based on a curvature radius and road gradient of the curve.

14. A driving force control method, comprising:
detecting a curve ahead of a vehicle;
setting a target vehicle speed to pass the detected curve;
setting a starting-point shift speed based on the detected curve ahead of the vehicle, to pass a starting point of the detected curve;
setting an end-point shift speed different from the starting-point shift speed to pass an end point of the detected curve different from the starting point of the detected curve; and
changing a shift speed to the end-point shift speed if, after a shift speed is changed to the starting-point shift speed, a vehicle speed is lower than or equal to a value corresponding to the target vehicle speed and a braking member is operated.

15. The driving force control method according to claim 14, wherein it is determined whether an additional engine brake is required at the starting-point shift speed, based on whether an accelerator member is operated.

16. The driving force control method according to claim 14, wherein the shift speed is changed to the end-point shift speed if a parameter indicating a deceleration state of the vehicle is larger than or equal to a predetermined value when the braking member is operated.

17. The driving force control apparatus according to claim 16, wherein the parameter indicating the deceleration state of the vehicle is any one of a brake master cylinder pressure, an acceleration of the vehicle, a rate of change in the acceleration of the vehicle, a brake pedal stroke, and a brake pedal force.

18. The driving force control apparatus according to claim 14, wherein the value corresponding to the target vehicle speed is a sum of a target turning vehicle speed determined based on a curvature radius of the curve and a target lateral acceleration, and a correction amount that is changed based on the curvature radius of the curve.

19. The driving force control apparatus according to claim 18, wherein the correction amount decreases as the curvature radius of the curve decreases.

20. The driving force control method according to claim 14, wherein
the shift speed is not changed to the end-point shift speed if, after the shift speed is changed to the starting-point shift speed, the vehicle speed is not lower than or equal to the value corresponding to the target vehicle speed or the braking member is not operated.

21. The driving force control method according to claim 14, wherein
the shift speed is changed to the end-point shift speed if a parameter indicating a deceleration state of the vehicle is larger than or equal to a predetermined value when the braking member is operated.

22. The driving force control method according to claim 21, wherein the parameter indicating the deceleration state of the vehicle is any one of a brake master cylinder pressure, an acceleration of the vehicle, a rate of change in the acceleration of the vehicle, a brake pedal stroke, and a brake pedal force.

23. The driving force control method according to claim 14, wherein the value corresponding to the target vehicle speed is a sum of a target turning vehicle speed determined based on a curvature radius of the curve and a target lateral acceleration, and a correction amount that is changed based on the curvature radius of the curve.

24. The driving force control method according to claim 23, wherein the correction amount decreases as the curvature radius of the curve decreases.

25. The driving force control method according to claim 14, wherein
the end-point shift speed is set based on the detected curve ahead of the vehicle.

26. The driving force control method according to claim 25, wherein
the end-point shift speed is set based on a curvature radius and road gradient of the curve.

* * * * *